United States Patent [19]
Estelle et al.

[11] Patent Number: 5,671,092
[45] Date of Patent: Sep. 23, 1997

[54] REVERSE GALILEAN FINDER WITH PROJECTED FRONT WINDOW

[75] Inventors: Lee R. Estelle; William B. Jones; John D. Griffith, all of Rochester, N.Y.

[73] Assignee: Eastman Kodak Company, Rochester, N.Y.

[21] Appl. No.: 326,557

[22] Filed: Oct. 20, 1994

[51] Int. Cl.$^6$ .......................... G02B 25/00; G02B 13/00; G02B 9/12
[52] U.S. Cl. .......................... 359/645; 359/744; 359/784
[58] Field of Search .......................... 359/643, 644, 359/645, 744, 784

[56] References Cited

U.S. PATENT DOCUMENTS

| | | | |
|---|---|---|---|
| 4,707,098 | 11/1987 | Wakamiya | 354/219 |
| 5,300,977 | 4/1994 | Lewis et al. | 359/738 |
| 5,335,034 | 8/1994 | Lewis et al. | 357/738 |

*Primary Examiner*—Georgia Y. Epps
*Assistant Examiner*—Jordan M. Schwartz
*Attorney, Agent, or Firm*—Svetlana Z. Short

[57] ABSTRACT

A reverse Galilean finder in which a front frame, preferably associated with a front element is projected away from the eye by the finder optics without separate frame projection optics to a position such that the distance between the apparent position of the frame to the eye and the rear vertex of the finder divided by the length of the finder is at least 2.2.

16 Claims, 1 Drawing Sheet

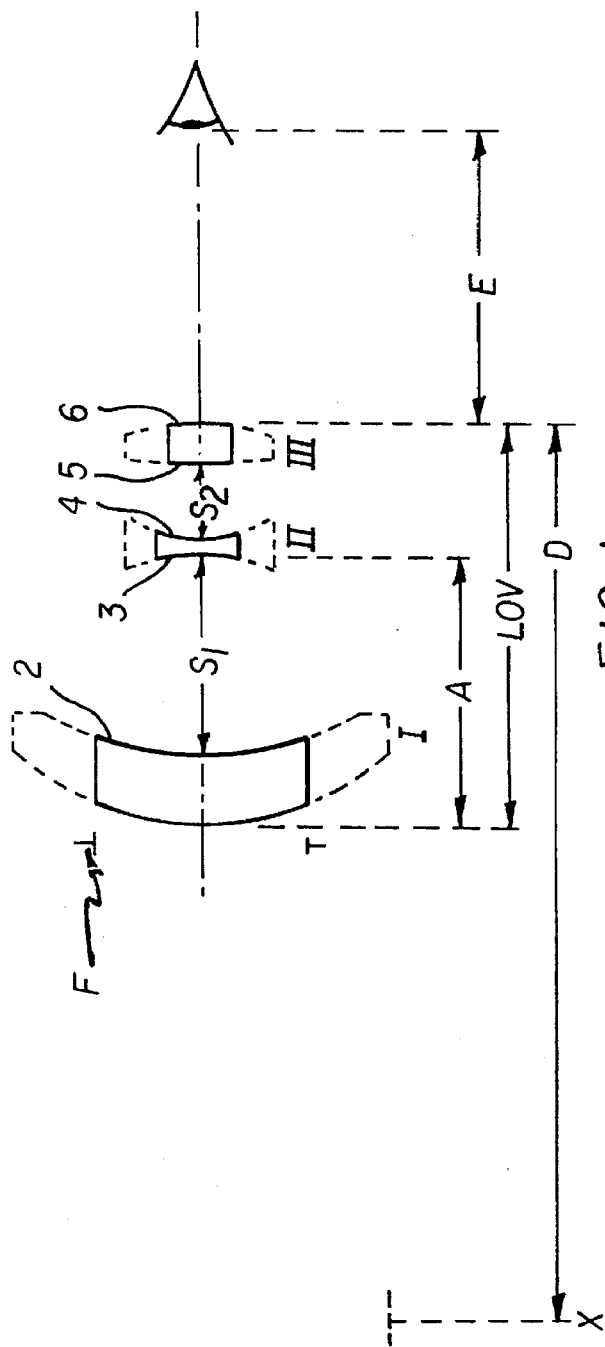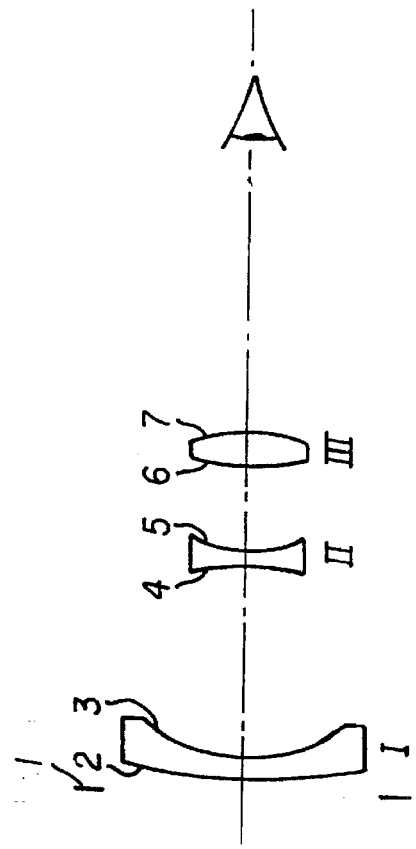
FIG. 1
FIG. 2

REVERSE GALILEAN FINDER WITH PROJECTED FRONT WINDOW

This invention relates to reverse Galilean finders and particularly reverse Galilean finders suitable for extremely inexpensive camera applications.

The least expensive of camera finders actually having refractive optical components is the reverse Galilean finder. It is generally composed of front negative and rear positive elements which allow the operator to place his eye in reasonably close proximity to it and see some sort of reduced and somewhat framed subject area. Because its front lens is negative and its rear lens is positive, it creates a virtual image of the subject in space which appears smaller to the eye. The frame of such a finder is generally positioned in the finder, for example, at its first surface, and is projected slightly ahead of the surface by the optical elements. However, it is so close to the eye it is not nearly in focus to the eye and can cause framing inaccuracies. At the least, it is of questionable use for framing.

"Albada" finders actually place the frame between the optical elements and project it to infinity, for example using a curved mirror between the elements or silvered on the inside of the front element. Projecting an image of the frame at infinity greatly improves the framing, but adds substantially to the cost of the finder.

It would be desirable to improve the framing of the Galilean finder without using the Albada approach, i.e., without using separate optics to project a frame into the object space from the finder.

SUMMARY OF THE INVENTION

Referring to FIG. 1, applicants have designed a finder, which is preferably of three elements, in which the rear two elements include a front negative element and a rear positive element which are both relatively close together and relatively powerful. Their powers and spacing are picked to maximize a ratio D/LOV where D is the distance from the rear vertex of the finder, shown as surface 6 in FIG. 1, to a position X where a front window defined by a baffle or first or front element of the finder is projected by the finder. LOV is the vertex-to-vertex length of the finder. This somewhat projected front window acts as a frame to assist in positioning the image for picture taking.

According to a preferred embodiment, the ratio of D/LOV should be greater than 2.2. With such a construction, the eye sees a virtual window or frame in space substantially in front of the finder which, although it may not be completely in focus to the eye, is close enough to being in focus to substantially reduce framing errors.

Also according to a preferred embodiment, a distance $S_2$ between the rear two components of the finder is preferably less than 7 mm and further preferably less than 35 percent of the entire finder length.

According to a further preferred embodiment, the finder includes a front lens element in addition to the rear two lens elements referred to above, which front lens element may or may not add substantial power to the finder but assists in its corrections. Preferably, it includes an aspheric rear surface. Aspheric surfaces may also be used on the other is elements, for example, on the rear surface of the front of the rear two elements.

BRIEF DESCRIPTION OF THE DRAWINGS

FIGS. 1 and 2 are schematics of alterative finders. FIG. 1 illustrates finders constructed according to Examples 1–5 and FIG. 2 illustrates finders constructed according to Example 6.

DETAILED DESCRIPTION OF THE INVENTION

The principles outlined in the Summary of the Invention are illustrated by the following Examples 1–6 in which all the dimensions and distances are in millimeters, the surfaces are numbered from the object side to the eyeside (in Example 6, surface 1 is a baffle, whereas in Examples 1–5, no separate baffle is provided and surface 1 is the front surface of the front element), the indices are the index of refraction for the sodium D line of the spectrum and V is the abbe dispersion number. All of the materials are plastic.

Example 1 (FIG. 1)

| | CLEAR APERTURES | | | | | |
|---|---|---|---|---|---|---|
| SURF. | SIDE-SIDE | TOP-BOTTOM | RADIUS | THICKNESS | INDEX | V |
| 1 | 20.26 | 14.00 | 18.9706 | 4.500 | 1.492 | 57.4 |
| 2 | 17.22 | 11.66 | ASPHERE | 13.878 | | |
| 3 | 6.78 | 4.16 | −12.2225 | 1.000 | 1.590 | 30.9 |
| 4 | 6.20 | 3.86 | ASPHERE | 5.183 | | |
| 5 | 6.38 | 3.62 | 24.9051 | 2.800 | 1.535 | 40.5 |
| 6 | 6.24 | 3.40 | −11.3662 | | | |

The lens length is 27.361.

ASPHERIC EQUATION:

$$X = \frac{CY^2}{1 + \sqrt{1 - (k+1)C^2Y^2}} + DY^4 + EY^6$$

SURF. 2  $C = 0.0517467$  $D = 0.11989E\text{-}03$
         $k = -12.986$   $E = -0.41722E\text{-}06$ SURF. 4  $C = 0.1300001$  $D = -0.29085E\text{-}04$
         $k = -0.7305$    $E = 0.85567E\text{-}06$ The apparent image of the front window from the eye is 83.8 mm.

| | VIEW FINDER ABERRATIONS (Negative Astigmatism Means Tangential Field is Close to the Eye) | | | |
|---|---|---|---|---|
| | ACCOMMODATION (DIOPTERS) | ASTIGMATISM (DIOPTERS) | DISTORTION (%) | LATERAL COLOR (MIN OR ARC) |
| AXIS | −1.00 | .00 | — | — |
| TOP | −.64 | .03 | 2.36 | 1.92 |
| SIDE | −.91 | .31 | −0.87 | 1.78 |
| CORNER | −1.18 | .29 | −2.02 | −1.40 |

Example 1 has an apparent half field of 14.52° with a half field of 23.355°. Magnification is 0.6 with eye relief of 20 mm. The lens length is 27.361. The apparent image of the front window from the eye is 83.8 mm.

Example 2 (FIG. 1)

| | CLEAR APERTURES | | | | | |
|---|---|---|---|---|---|---|
| SURF. | SIDE-SIDE | TOP-BOTTOM | RADIUS | THICKNESS | INDEX | V |
| 1 | 20.32 | 14.00 | 18.9706 | 3.000 | 1.492 | 57.4 |
| 2 | 18.50 | 12.52 | ASPHERE | 15.428 | | |
| 3 | 6.78 | 4.16 | −12.1057 | 1.000 | 1.590 | 30.9 |
| 4 | 6.20 | 3.86 | ASPHERE | 5.116 | | |
| 5 | 6.38 | 3.62 | 24.6275 | 2.800 | 1.535 | 40.5 |
| 6 | 6.24 | 3.40 | −11.3856 | | | |

The lens length is 27.344.

ASPHERIC EQUATION:
$$X = \frac{CY^2}{1 + \sqrt{1-(k+1)C^2Y^2}} + DY^4 + EY^6$$

SURF. 2  $C = 0.0481573$   $D = 0.976482E\text{-}04$
$k = -13.0817$   $E = -0.292343E\text{-}06$ SURF. 4  $C = 0.1300001$   $D = -0.108809E\text{-}04$
$k = -0.4968000$   $E = 0.318943E\text{-}06$ The apparent image of the front window from the eye is 83.8 mm.

| | VIEW FINDER ABERRATIONS (Negative Astigmatism Means Tangential Field Is Closer to the Eye) | | | |
|---|---|---|---|---|
| | ACCOMODATION (DIOPTERS) | ASTIGMATISM (DIOPTERS) | DISTORTION (%) | LATERAL COLOR (MIN OR ARC) |
| AXIS | −1.00 | .00 | — | — |
| TOP | −.63 | .03 | 2.38 | 2.12 |
| SIDE | −.92 | .21 | −0.99 | 1.78 |
| CORNER | −1.17 | .29 | −2.10 | −1.34 |

The apparent half field is 14.52° with a half field of 23.36°. Magnification is 0.6 and eye relief is 20 mm. This design is similar to Example 1 with slightly reduced front element thickness.

Example 3 (FIG. 1)

CLEAR APERTURES (5)

| SURF. | SIDE-SIDE | TOP-BOTTOM | RADIUS | THICKNESS | INDEX | V |
|---|---|---|---|---|---|---|
| 1 | 18.80 | 10.42 | 19.4598 | 3.000 | 1.492 | 57.4 |
| 2 | 15.98 | 8.86 | ASPHERE | 11.750 | | |
| 3 | 7.56 | 3.54 | −14.1330 | 1.000 | 1.590 | 30.9 |
| 4 | 6.86 | 3.28 | ASPHERE | 5.253 | | |
| 5 | 7.30 | 3.00 | 19.0472 | 2.800 | 1.535 | 40.5 |
| 6 | 7.14 | 2.94 | −12.3591 | | | |

The lens length is 23.803.

ASPHERIC EQUATION:

$$X = \frac{CY^2}{1 + \sqrt{1-(k+1)C^2Y^2}} + DY^4 + EY^6$$

SURF. 2  $C = 0.0.709620$  $D = 0.2578E\text{-}03$
$k = -10.62021$  $E = -0.1201E\text{-}05$ SURF. 4  $C = 0.1355730$  $D = -0.1247E\text{-}03$
$k = -0.3073000$  $E = 0.2070E\text{-}05$ The apparent image of the front window from the eye is 83.9 mm.

VIEW FINDER ABERRATIONS
(Negative Astigmatism Means Tangential Field Is Closer to the Eye)

| | ACCOMMODATION (DIOPTERS) | ASTIGMATISM (DIOPTERS) | DISTORTION (%) | LATERAL COLOR (MIN OR ARC) |
|---|---|---|---|---|
| AXIS | −1.00 | .00 | — | — |
| TOP | −.52 | .10 | 2.99 | 2.03 |
| SIDE | −.99 | .23 | −1.37 | 0.58 |
| CORNER | −1.17 | .29 | −2.00 | −3.61 |

-continued
ASPHERIC EQUATION:
SURF. 2  $C = 0.0642385$  $D = 0.3112000E\text{-}03$  $F = 0.5395999E\text{-}08$
$k = -17.482000$  $E = -0.23310000E\text{-}05$ SURF. 4  $C = 0.1536098$  $D = 0.268000E\text{-}04$  $F = -0.1473000E\text{-}06$
$k = -1.0470000$  $E = 0.1017000E\text{-}04$ The apparent image of the front window from the eye is 83.9 mm.

The apparent half field of 15.03° with a semi-field of 28.24°. Magnification is 0.5 and eye relief is 20 mm. This Example is similar to Examples 1 and 2 except that the length of the finder has been reduced while increasing the field of view with the magnification reduced to 2.5.

Example 4 (FIG. 1)

CLEAR APERTURES (5)

| SURF. | SIDE-SIDE | TOP-BOTTOM | RADIUS | THICKNESS | INDEX | V |
|---|---|---|---|---|---|---|
| 1 | 18.70 | 10.40 | 20.0010 | 3.000 | 1.492 | 57.4 |
| 2 | 16.07 | 8.88 | ASPHERE | 11.258 | | |
| 3 | 7.55 | 3.53 | −14.0564 | 1.000 | 1.590 | 30.9 |
| 4 | 6.78 | 3.25 | ASPHERE | 4.746 | | |
| 5 | 7.32 | 3.06 | 19.4728 | 3.800 | 1.535 | 40.5 |
| 6 | 7.17 | 2.94 | −11.2489 | | | |

The lens length is 23.804.

ASPHERIC EQUATION:

$$X = \frac{CY^2}{1 + \sqrt{1-(k+1)C^2Y^2}} + DY^4 + EY^6 + FY^8$$

| VIEW FINDER ABERRATIONS (Negative Astigmatism Means Tangential Field Is Closer to the Eye) | | | | |
|---|---|---|---|---|
| | ACCOMMODATION (DIOPTERS) | ASTIGMATISM (DIOPTERS) | DISTORTION (%) | LATERAL COLOR (MIN OR ARC) |
| AXIS | −1.00 | .00 | — | — |
| TOP | −.52 | .03 | 2.90 | 1.98 |
| SIDE | −.99 | .27 | 0.21 | 0.81 |
| CORNER | −1.18 | −.37 | 0.04 | −3.82 |

Example 4 has an apparent half field of 15.03° and a semi-field of 28.24°. The magnification is 0.25 and eye relief is 20 mm. Example 4 is similar to Example 3 with somewhat increased thickness of the third element. The distortion has been reduced by more complicated aspheric surfaces. The front element bending and power has been reduced.

Example 5 (FIG. 1)

CLEAR APERTURES (5)

| SURF. | SIDE-SIDE | TOP-BOTTOM | RADIUS | THICKNESS | INDEX | V |
|---|---|---|---|---|---|---|
| 1 | 19.02 | 10.44 | 20.0010 | 3.000 | 1.492 | 57.4 |
| 2 | 16.70 | 8.92 | ASPHERE | 9.999 | | |
| 3 | 8.02 | 3.83 | −12.5441 | 1.000 | 1.590 | 30.9 |
| 4 | 7.20 | 3.55 | ASPHERE | 6.014 | | |
| 5 | 7.36 | 3.07 | 31.8320 | 3.800 | 1.535 | 40.5 |
| 6 | 7.15 | 2.94 | −11.7740 | | | |

The lens length is 23.813.

ASPHERIC EQUATION:

$$X = \frac{CY^2}{1 + \sqrt{1 - (k+1)C^2Y^2}} + DY^4 + EY^6 + FY^8$$

SURF. 2  $C = 0.0579542$  $D = 0.13468E\text{-}03$  $F = 0.38523e\text{-}08$
         $k = -8.6010$    $E = -0.14504E\text{-}05$ SURF. 4  $C = 0.1206870$  $D = 0.79148E\text{-}04$  $F = -0.20755E\text{-}06$
         $k = -0.9551$    $E = 0.96225E\text{-}05$ The apparent image of the front window from the eye is 83.7 mm.

| VIEW FINDER ABERRATIONS (Negative Astigmatism Means Tangential Field Is Closer to the Eye) | | | | |
|---|---|---|---|---|
| | ACCOMMODATION (DIOPTERS) | ASTIGMATISM (DIOPTERS) | DISTORTION (%) | LATERAL COLOR (MIN OR ARC) |
| AXIS | −1.00 | .00 | — | — |
| TOP | −.70 | .34 | 1.02 | 2.53 |
| SIDE | −1.20 | .32 | 1.00 | 2.08 |
| CORNER | −1.25 | .50 | 1.31 | −0.78 |

Example 5 has an apparent half field of 15.03° and a semi-field of 0.24°. Magnification is 0.5 and eye relief is 20. Example 5 is similar to Example 4 except that the field curvature and distortion have been somewhat improved at lower obliquities.

Example 6 (FIG.2)

CLEAR APERTURES (4,5)

| SURF. | SIDE-SIDE | TOP-BOTTOM | RADIUS | THICKNESS | INDEX | V |
|---|---|---|---|---|---|---|
| 1 | 14.81 | 8.10 | | 1.000 | | |
| 2 | 13.35 | 7.47 | 41.8100 | 1.250 | 1.492 | 57.4 |
| 3 | 11.56 | 6.77 | ASPHERE | 12.469 | | |
| 4 | 6.31 | 3.38 | −19.0065 | 1.000 | 1.492 | 57.4 |
| 5 | 5.92 | 3.22 | 7.7907 | 5.731 | | |
| 6 | 6.39 | 3.29 | 17.2674 | 2.000 | 1.492 | 57.4 |
| 7 | 6.30 | 3.19 | −13.2751 | | | |

The lens length is 22.4500.

ASPHERIC EQUATION SURFACE 3

$$X = \frac{CY^2}{1 + \sqrt{1 - (k+1)C^2Y^2}} + DY^4 + EY^6 + FY^8$$

$C = 1.1028695823756$  $D = -1.682683178888E\text{-}04$
$F = -3.614091665108E\text{-}08$
$k = 0.033811605023$  $E = 1.641004764352E\text{-}06$ Example 6 has an apparent half field of 11.9° and a semi-field of 29.7°. Magnification is 0.37 and eye relief is 20 mm. Example 6 has a much reduced magnification which further allows an increase in the distance from the eye to the apparent window.

The apparent window or frame can be determined starting with the following equation:

$$D = -\left| BF - \frac{EF^2}{FF + A} \right|$$

BF is the back focus of combined elements II and III. FF is the front focus of combined elements II and III. EF is the focal length of combined elements of II and III. A is the apparent object distance of the window from the front vertex of element II. D is the distance from the rear vertex of element 1511 to the apparent image of the window as seen by the eye. The distance D is added to the eye relief, for example, 20 mm, to determine the total distance of the projected window to the eye. The sign convention is related to the vertex reference, and negative means the distance is to the left of the reference vertex, i.e., away from the eye.

Interestingly, the focal length of the combination of elements II and III can be either positive or negative as long as the components of the equation achieve the required values. By judicially choosing the powers of elements II and III, especially the relatively strong power in element II, and depending on the allowable dimensions of the finder, it is possible to achieve an inequality in which R is greater than 2.2, where R is equal to D/LOV, where LOV is the vertex-to-vertex length of the finder. The distance from the eye to the apparent position of the from window X is equal to D+E, E being an acceptable eye relief, chosen at 20 mm in each of the Examples. The absolute value of D should be greater than 60.

The following Table 1 provides the values for the elements of the above equations for each of the Examples. Again, all distances are in millimeters.

TABLE 1

| EXAMPLE | EF (II/III) | FF (II/III) | BF (II/III) | A | D | LOV |
|---|---|---|---|---|---|---|
| 1 | −292.68 | −161.27 | −545.20 | −16.68 | −63.81 | 27.4 |
| 2 | −248.21 | −137.76 | −461.02 | −17.35 | −63.82 | 27.3 |
| 3 | +463.84 | +250.18 | +845.62 | −13.63 | −63.89 | 23.8 |
| 4 | +1171.22 | +614.04 | +2218.95 | −13.15 | −63.89 | 23.8 |
| 5 | −1360.92 | −689.95 | −2702.56 | −11.90 | −63.65 | 23.8 |
| 6 | +77.55 | +43.62 | +123.93 | −14.16 | −80.20 | 22.5 |

Note that the arrangement in powers of the elements II and III are important to the computation of D but that EF can be either positive or negative and still work. It also appears important that elements II and III be closely spaced compared to the length of the finder. More specifically, it is preferred that $S_2$, the distance between elements II and III is less than 7 mm and also less than 35 percent of LOV.

Note also that the front element, element I, while having a very small power in Examples 1–5, has somewhat more negative power in Example 6. The aspheric surface toward the eye on element I can be and is used to improve the corrections of the lens, especially astigmatism and off axis spherical aberration.

Note that the elements in Example 6 are conveniently made from the same plastic, which can be methyl methacrylate.

These finder designs all provide extremely low cost and an extremely compact finder with less tendency toward framing error than other such reverse Galilean finders that do not, in fact, separately project the frame.

The invention has been described in detail with particular reference to a preferred embodiment thereof, but it will be understood that variations and modifications can be effected within the spirit and scope of the invention as described hereinabove and as defined in the appended claims.

We claim:

1. A reverse Galilean finder having first, second and third elements from a front object side to a rear eye side, said first element having a front vertex at the surface facing the front object side and said third element having a rear vertex at the surface facing the rear eye side, a frame positioned on the object side of said first element substantially at the front vertex providing the entire framing function of the finder, the elements having powers and spacings which are chosen to project an apparent image of the frame away from an eye of a user such that a ratio D/LOV is greater than 2.2, where D is equal to the distance from said rear vertex to said apparent image and LOV is equal to the length of the finder from said front vertex to said rear vertex.

2. A finder according to claim 1 wherein D has an absolute value which is greater than 60 mm.

3. A finder according to claim 2 wherein the spacing between the second and third elements is less than 7 mm.

4. A finder according to claim 2 wherein the spacing between the second and third elements is less than 35 percent of LOV.

5. A finder according to claim 2 wherein the second element is negative and the third element is positive.

6. A finder according to claim 3 wherein the second element is negative and the third element is positive.

7. A finder according to claim 1 wherein the distance between the eye and said apparent image is at least 75 mm.

8. A finder according to claim 1 wherein D has an absolute value which is greater than 75 mm.

9. A finder according to claim 1 wherein the first element has a rear surface which is aspheric, said rear surface being the surface facing the rear eye side.

10. A finder according to claim 6 wherein the first element has a rear surface which is aspheric, said rear surface being the surface facing the rear eye side.

11. A reverse Galilean finder constructed according to the following specifications wherein all distances are in millimeters, the index of refraction is for the D line of the spectrum and V is the abbe number:

| SURF. | RADIUS | THICKNESS | INDEX | V |
|---|---|---|---|---|
| 1 | 18.9706 | 4.500 | 1.492 | 57.4 |
| 2 | ASPHERE | 13.878 | | |
| 3 | −12.2225 | 1.000 | 1.590 | 30.9 |
| 4 | ASPHERE | 5.183 | | |
| 5 | 24.9051 | 2.800 | 1.535 | 40.5 |
| 6 | −11.3662 | | | |

ASPHERIC EQUATION:

$$X = \frac{CY^2}{1 + \sqrt{1 - (k+1)C^2Y^2}} + DY^4 + EY^6$$

SURF. 2

C = 0.0517467      D = 0.11989E-03
k = −12.986        E = −0.41722E-06

SURF. 4

C = 0.1300001      D = −0.29085E-04
k = −0.7305        E = 0.85567E-06.

12. A reverse Galilean finder constructed according to the following specifications wherein all distances are in millimeters, the index of refraction is for the D line of the spectrum and V is the abbe number:

| SURF. | RADIUS | THICKNESS | INDEX | V |
|---|---|---|---|---|
| 1 | 18.9706 | 3.000 | 1.492 | 57.4 |
| 2 | ASPHERE | 15.428 | | |
| 3 | −12.1057 | 1.000 | 1.590 | 30.9 |
| 4 | ASPHERE | 5.116 | | |
| 5 | 24.6275 | 2.800 | 1.535 | 40.5 |
| 6 | −11.3856 | | | |

ASPHERIC EQUATION:

$$X = \frac{CY^2}{1 + \sqrt{1 - (k+1)C^2Y^2}} + DY^4 + EY^6$$

SURF. 2

C = 0.0481573      D = 0.976482E-04
k = −13.0817       E = −0.292343E-06

-continued

| SURF. | RADIUS | THICKNESS | INDEX | V |
|---|---|---|---|---|

SURF. 4

C = 0.1300001      D = −0.108809E-03
k = −0.4968000     E = 0.318943E-06.

13. A reverse Galilean finder constructed according to the following specifications wherein all distances are in millimeters, the index of refraction is for the D line of the spectrum and V is the abbe number:

| SURF. | RADIUS | THICKNESS | INDEX | V |
|---|---|---|---|---|
| 1 | 19.4598 | 3.000 | 1.492 | 57.4 |
| 2 | ASPHERE | 11.750 | | |
| 3 | −14.1330 | 1.000 | 1.590 | 30.9 |
| 4 | ASPHERE | 5.253 | | |
| 5 | 19.0472 | 2.800 | 1.535 | 40.5 |
| 6 | −12.3591 | | | |

ASPHERIC EQUATION:

$$X = \frac{CY^2}{1 + \sqrt{1 - (k+1)C^2Y^2}} + DY^4 + EY^6$$

SURF. 2

C = 0.0.709620     D = 0.2578E-03
k = −10.62021      E = −0.1201E-05

SURF. 4

C = 0.1355730      D = −0.1247E-03
k = −0.3073000     E = 0.2070E-05.

14. A reverse Galilean finder constructed according to the following specifications wherein all distances are in millimeters, the index of refraction is for the D line of the spectrum and V is the abbe number:

| SURF. | RADIUS | THICKNESS | INDEX | V |
|---|---|---|---|---|
| 1 | 20.0010 | 3.060 | 1.492 | 57.4 |
| 2 | ASPHERE | 11.258 | | |
| 3 | −14.0564 | 1.000 | 1.590 | 30.9 |
| 4 | ASPHERE | 4.746 | | |
| 5 | 19.4728 | 3.800 | 1.535 | 40.5 |
| 6 | −11.2489 | | | |

ASPHERIC EQUATION:

$$X = \frac{CY^2}{1 + \sqrt{1 - (k+1)C^2Y^2}} + DY^4 + EY^6 + FY^8$$

SURF. 2

C = 0.0642385      D = 0.3112000E-03      F = 0.5395999E-08
k = −17.482000     E = −0.2331000E-05

SURF. 4

C = 0.1536098      D = 0.268000E-04       F = −0.1473000E-06
k = −1.0470000     E = 0.1017000E-04.

15. A reverse Galilean finder constructed according to the following specifications wherein all distances are in millimeters, the index of refraction is for the D line of the spectrum and V is the abbe number:

| SURF. | RADIUS | THICKNESS | INDEX | V |
|---|---|---|---|---|
| 1 | 20.0010 | 3.000 | 1.492 | 57.4 |
| 2 | ASPHERE | 9.999 | | |
| 3 | −12.5441 | 1.000 | 1.590 | 30.9 |
| 4 | ASPHERE | 6.014 | | |
| 5 | 31.8320 | 3.800 | 1.535 | 40.5 |
| 6 | −11.7740 | | | |

ASPHERIC EQUATION:

$$X = \frac{CY^2}{1+\sqrt{1-(k+1)C^2Y^2}} + DY^4 + EY^6 + FY^8$$

SURF. 2

C = 0.0579542   D = 0.13468E-03   F = 0.385230e-08
k = −8.6010    E = −0.14504E-05

SURF. 4

C = 0.1206870   D = 0.79148E-04   F = −0.20755E-06
k = −0.9551    E = 0.96225E-05.

16. A reverse Galilean finder constructed according to the following specifications wherein all distances are in millimeters, the index of refraction is for the D line of the spectrum and V is the abbe number:

| SURF. | RADIUS | THICKNESS | INDEX | V |
|---|---|---|---|---|
| 1 | * | 1.000 | | |
| 2 | 41.8100 | 1.250 | 1.492 | 57.4 |
| 3 | ASPHERE | 12.469 | | |
| 4 | −19.0065 | 1.000 | 1.492 | 57.4 |
| 5 | 7.7907 | 5.731 | | |
| 6 | 17.2674 | 2.000 | 1.492 | 57.4 |
| 7 | −13.2751 | | | |

*Frame

ASPHERIC EQUATION SURFACE 3

$$X = \frac{CY^2}{1+\sqrt{1-(k+1)C^2Y^2}} + DY^4 + EY^6 + FY^8$$

C = 0.102869582376   D = −1.682683178888E-04   F = −3.614091665108E-08
k = 0.033811605023   E = 1.641004764352F-06.

*Frame

* * * * *